(12) United States Patent
Lim et al.

(10) Patent No.: US 8,429,297 B1
(45) Date of Patent: Apr. 23, 2013

(54) WEB SERVICE INVOCATION FRAMEWORK WITH INTEGRATED DIRECTORY-BASED DISTRIBUTOR

(75) Inventors: Swee B. Lim, Cupertino, CA (US); Michael J. Wookey, Los Gatos, CA (US)

(73) Assignee: Oracle America, Inc., Redwood City, CA (US)

( * ) Notice: Subject to any disclaimer, the term of this patent is extended or adjusted under 35 U.S.C. 154(b) by 1297 days.

(21) Appl. No.: 11/238,498

(22) Filed: Sep. 28, 2005

(51) Int. Cl.
*G06F 15/16* (2006.01)

(52) U.S. Cl.
USPC .......... 709/245; 709/228; 709/233; 709/206; 717/138; 717/101

(58) Field of Classification Search .................. 709/245, 709/203
See application file for complete search history.

(56) References Cited

U.S. PATENT DOCUMENTS

| | | | |
|---|---|---|---|
| 6,327,622 B1* | 12/2001 | Jindal et al. | 709/228 |
| 7,130,891 B2* | 10/2006 | Bernardin et al. | 709/218 |
| 2004/0006653 A1* | 1/2004 | Kamen et al. | 709/330 |
| 2006/0070019 A1* | 3/2006 | Vishnumurty et al. | 717/101 |

OTHER PUBLICATIONS

Vivek S. Pai, et al, "Locality-Aware Request Distribution in cluster-based Network Servers", Oct. 1998, ACM, 1-58113-107-0/98/0010, pp. 205-216.*
U.S. Appl. No. 11/238,534, Lim et al.

* cited by examiner

*Primary Examiner* — Hua Fan
(74) *Attorney, Agent, or Firm* — Brooks Kushman P.C.

(57) ABSTRACT

In one embodiment, an apparatus for directory-based web service distribution is disclosed. The apparatus includes a directory and a request client to initiate a request for a web service, the request client including an application middleware having invocation framework with embedded distribution logic to distribute the request to a destination pod, the destination pod to compute a subset of a state associated with the web service, wherein the distribution logic to distribute the request based on a lookup value extracted from the request and submitted to the directory to determine the destination pod. Other embodiments are also disclosed.

19 Claims, 6 Drawing Sheets

WEB SERVICE INVOCATION FRAMEWORK WITH INTEGRATED DIRECTORY-BASED DISTRIBUTOR

FIELD OF INVENTION

An embodiment of the invention relates to web services distribution, and more specifically, to a web service invocation framework with an integrated directory-based distributor.

BACKGROUND OF INVENTION

Web services are adapted to the Web and are capable of bridging any operating system, hardware platform, or programming language by enabling program-to-program communication for direct interaction. Web services provide a layer of abstraction above existing software systems, such as application servers, CORBA (common object request broker architecture), J2EE (Java2 Platform, Enterprise Edition), .NET servers, messaging, and packaged applications. Through web services, applications at various Internet locations can be directly integrated and interconnected as if they were a part of a single, large information technology (IT) system.

Currently, underlying back-end infrastructure for stateful web services is focused on a single deployment model. Namely, a large-scale stateful web service is implemented by a large server hosted within a data center. This system forces the clients to communicate directly with the server in the data center. The system is expensive to create, maintain, and even more importantly, to scale-up. Furthermore, such a system makes it difficult to deal with costs and uncertainties associated with increased demand for capacity in the system.

In contrast, it may be beneficial to employ a system with a large number of low-cost commodity servers, instead of a large server. Such a system can scale up to handle more workload by adding multiple low-cost commodity servers, instead of adding capacity or upgrading a single server or fewer existing servers. These multiple low-cost commodity servers, which may be known as pods, can hold a subset (or in some cases, a partition) of the state of the web service. However, distribution of requests within such a system (so that the request is directed to the pod with the state needed to handle the request) would have to be dealt with in a novel way.

One prior art request distribution system utilizes content embedded in a request to drive load distribution. This technique has been implemented in a number of products, such as HTTP load balancers, XML routers, etc. The load distribution of these products is driven by rules or policies that are configured into the product, and do not leverage an external directory. However, this prior art distribution system is lacking in the following ways:

(1) Limited by the number of rules or policies that can be supported. This limitation introduces two significant restrictions. The first restriction is that the number of partitioned pods for the load distributor to distribute requests is limited because each pod has to be represented by at least one rule or policy. The second restriction is that it limits the choice of attributes that can be used to partition the state of the web service. For example, it would be inappropriate to partition the state of the web service by asset ID (an asset can be a server, a storage device, a software package . . . etc.) if there are millions of assets. A rule or policy would be required for each asset ID, resulting in million of rules or policies, which far exceeds the limited number supported.

(2) Rules and policies are not intended to be changed dynamically. For instance, consider the above example where the rules and policies would have to be updated when assets are added, removed, or when pods are changed. The system is not suitable for frequent dynamic updates and/or changes to the rules and policies. In many cases, the prior art interfaces are proprietary and designed for linear insertion or enumeration of rules or policies. Additionally, these rules and policies require lengthy and resource-intensive compilation into another internal form before taking effect.

(3) Individual product instances have to be independently managed. A large-scale system will have multiple instances of these products deployed in multiple sites in order to support a large-scale geographically distributed web service. Typically, each of these instances will have to be configured using proprietary interfaces when changes to the rules and policies are needed. This can be a management burden, especially if their configurations must be kept up-to-date when there are frequent changes, as well as failures of some instances.

Another prior art distribution systems may utilize session persistence by way of either addresses or cookies. These techniques consistently direct requests associated with a session to a particular server. Typically, an internal hashing technique or associative table is constructed by dynamic learning through observing traffic. However, there is little external control over how distribution is performed, and there is no coordination across instances. Hence, this form of session persistence is inappropriate for request distribution to pods with a subset (or partition) of the web service's state.

SUMMARY OF INVENTION

The present invention includes novel methods and apparatus for a web service invocation framework with an integrated directory-based distributor.

According to one embodiment of the invention, an apparatus is disclosed. The apparatus includes a directory and a request client to initiate a request for a web service, the request client including an application middleware having invocation framework with embedded distribution logic to distribute the request to a destination pod, the destination pod to compute a subset of a state associated with the web service, wherein the distribution logic to distribute the request based on a lookup value extracted from the request and submitted to the directory to determine the destination pod.

According to another embodiment of the invention, a method is disclosed. The method includes: initiating at a request client a request for a web service; extracting, by an invocation framework of an application middleware of the request client, one or more values from the request based on configuration rules of the invocation framework; determining a destination pod of a plurality of pods to direct the request by applying the one or more extracted values as lookup keys to a directory, wherein the directory associates the lookup keys to entries including information to identify the plurality of pods; and transmitting, by the invocation framework, the request to the destination pod.

BRIEF DESCRIPTION OF THE DRAWINGS

The invention may be best understood by referring to the following description and accompanying drawings that are used to illustrate embodiments of the invention. In the drawings.

DETAILED DESCRIPTION

Figure 1:
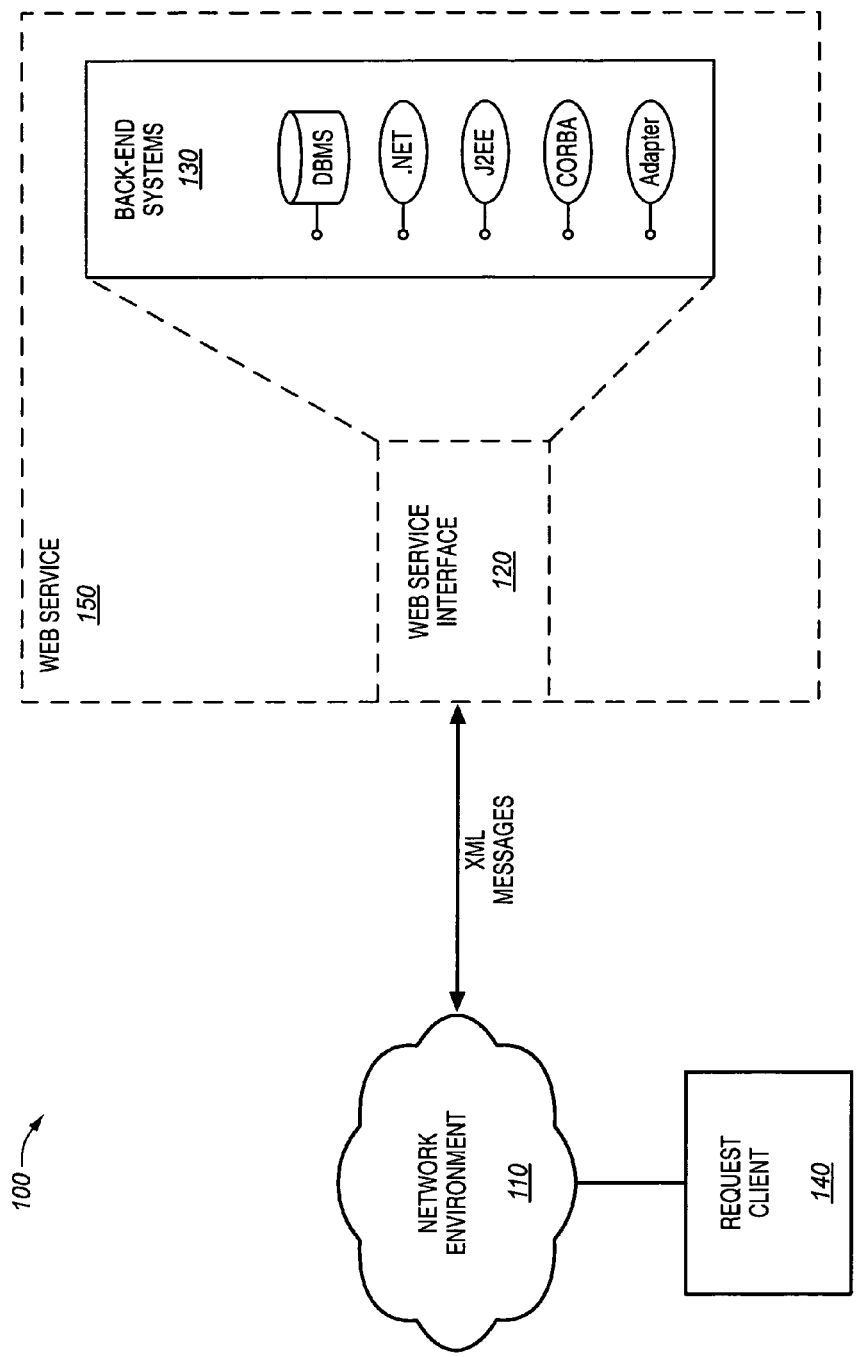
FIG. 1 is a block diagram of one embodiment of a network system.

An apparatus and method are described for a web service invocation framework with integrated directory-based distributor. According to one embodiment, the apparatus includes a directory and a request client to initiate a request for a web service, the request client including an application middleware having invocation framework with embedded distribution logic to distribute the request to a destination pod, the destination pod to compute a subset of a state associated with the web service, wherein the distribution logic to distribute the request based on a lookup value extracted from the request and submitted to the directory to determine the destination pod.

In the following description, numerous details are set forth. It will be apparent, however, to one skilled in the art that embodiments of the present invention may be practiced without these specific details. In other instances, well-known structures, devices, and techniques have not been shown in detail, in order to avoid obscuring the understanding of the description. The description is thus to be regarded as illustrative instead of limiting.

Reference in the specification to "one embodiment" or "an embodiment" means that a particular feature, structure, or characteristic described in connection with the embodiment is included in at least an embodiment of the invention. The appearances of the phrase "in one embodiment" in various places in the specification are not necessarily all referring to the same embodiment.

Also, select embodiments of the present invention include various operations, which are described herein. The operations of the embodiments of the present invention may be performed by hardware components or may be embodied in machine-executable instructions, which may be in turn utilized to cause a general-purpose or special-purpose processor, or logic circuits programmed with the instructions, to perform the operations. Alternatively, the operations may be performed by a combination of hardware and software.

Moreover, embodiments of the present invention may be provided as computer program products, which may include machine-readable medium having stored thereon instructions used to program a computer (or other electronic devices) to perform a process according to embodiments of the present invention. The machine-readable medium may include, but is not limited to, floppy diskettes, hard disk, optical disks, CD-ROMs, and magneto-optical disks, read-only memories (ROMs), random-access memories (RAMs), erasable programmable ROMs (EPROMs), electrically EPROMs (EEPROMs), magnetic or optical cards, flash memory, or other types of media or machine-readable medium suitable for storing electronic instructions and/or data. Moreover, data discussed herein may be stored in a single database, multiple databases, or otherwise in select forms (such as in a table).

Additionally, embodiments of the present invention may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Embodiments of the present invention enable a web service invocation framework with an integrated directory-based distributor. This invocation framework may be part of a large and scalable geographically distributed system that implements one or more "stateful" web services constructed using horizontal scaling techniques that distribute incoming requests among multiple points of deployments. These multiple points of deployment may also be known as pods. A pod may be a single server or a cluster of servers, with each pod including the server's associated storage and networking devices.

In some embodiments, each of the pods may implement one or more web services. Each of the pods may also include some subset(s) of the state of each of the web services implemented by the pod. In other words, the state of a web service is divided into subsets and assigned to the pods that implement the web service. The subsets may even be replicated among multiple pods that implement the same web service. For example, the web service's state may be partitioned across pods by asset ID, customer ID, or content type. To simplify the following description, the described embodiments below will show a pod implementing only one web service and having a subset of the state of that one web service. One skilled in the art will appreciate that a variety of other implementations may also be applicable.

In the following description the terms 'subset' and 'partition' may be referenced. As used in the following description, a subset refers to a set of which all elements are contained in another set. As used in the following description, a partition refers to a subset where there is no intersection/overlap with other subsets. Accordingly, a subset is broader term and allows for intersection/overlap between other subsets.

FIG. 1 illustrates a block diagram of one embodiment of a network system 100 capable of supporting directory-based web service request distribution of embodiments of the present invention. Network system 100 includes a network environment 110, a request client 140, and a web service 150. The web service 150 includes a web service interface 120 and a back-end system 130. The web service interface 120 allows for a standard approach for the network environment 110 to interface with the back-end systems 130.

In some embodiments, the back-end systems 130 implement the web service 150 (i.e., perform the computations associated with the web service 150). The back-end systems 130 may include database management systems (DBMS), .NET, J2EE (Java2 Platform, Enterprise Edition), CORBA (common object request broker architecture), objects, adapters to enterprise resource planning (ERP) packages, integration brokers, and other systems.

The request client 140 invokes the web service interface. The request client 140 may be any kind of system capable of making a web service request by sending a XML message to invoke the web service 150. The request client 140 may itself be the same or a different web service than web services 150.

Figure 2:
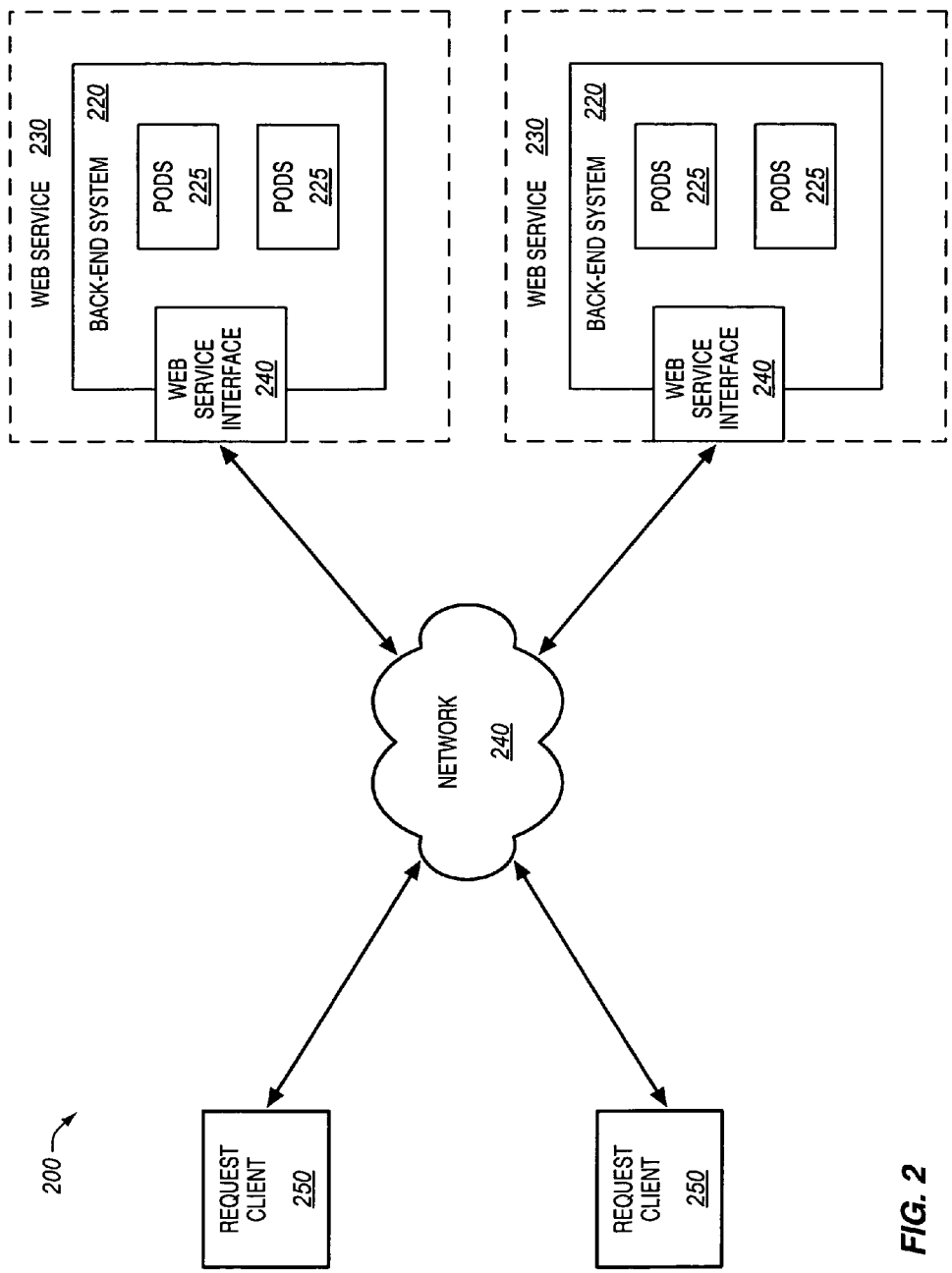
FIG. 2 is a block diagram illustrating one embodiment of a large and scalable geographically distributed system that implements multiple stateful web services.

FIG. 2 is a block diagram illustrating one embodiment of a large and scalable geographically distributed web service system 200 that implements multiple "stateful" web services. The scalable distributed web service system 200 includes one or more web services 230, one or more request clients 250, and a network environment 240 that allows the request clients 250 and the web services 230 to communicate. In one embodiment, each web service 230 is an instance of web service 150 described with respect to FIG. 1. Each web service 230 includes a web service interface 210 and a web service back-end system 220 that does the actual computation for the web service.

In some embodiments, back-end system 220 may include multiple servers geographically distributed in a wide-scale fashion. In other embodiments, the request client 250 is the same as the request client 140 described with respect to FIG. 1. The request client 250 can be any system capable of initiating a web service request. The request client 250 may also a web service 230. One skilled in the art will appreciate that web service back-end system 220 may include additional modules and tiers as necessary to accomplish particular objectives. The web service back-end system 220 will be described in more detail below with respect to FIG. 3.

Figure 3:
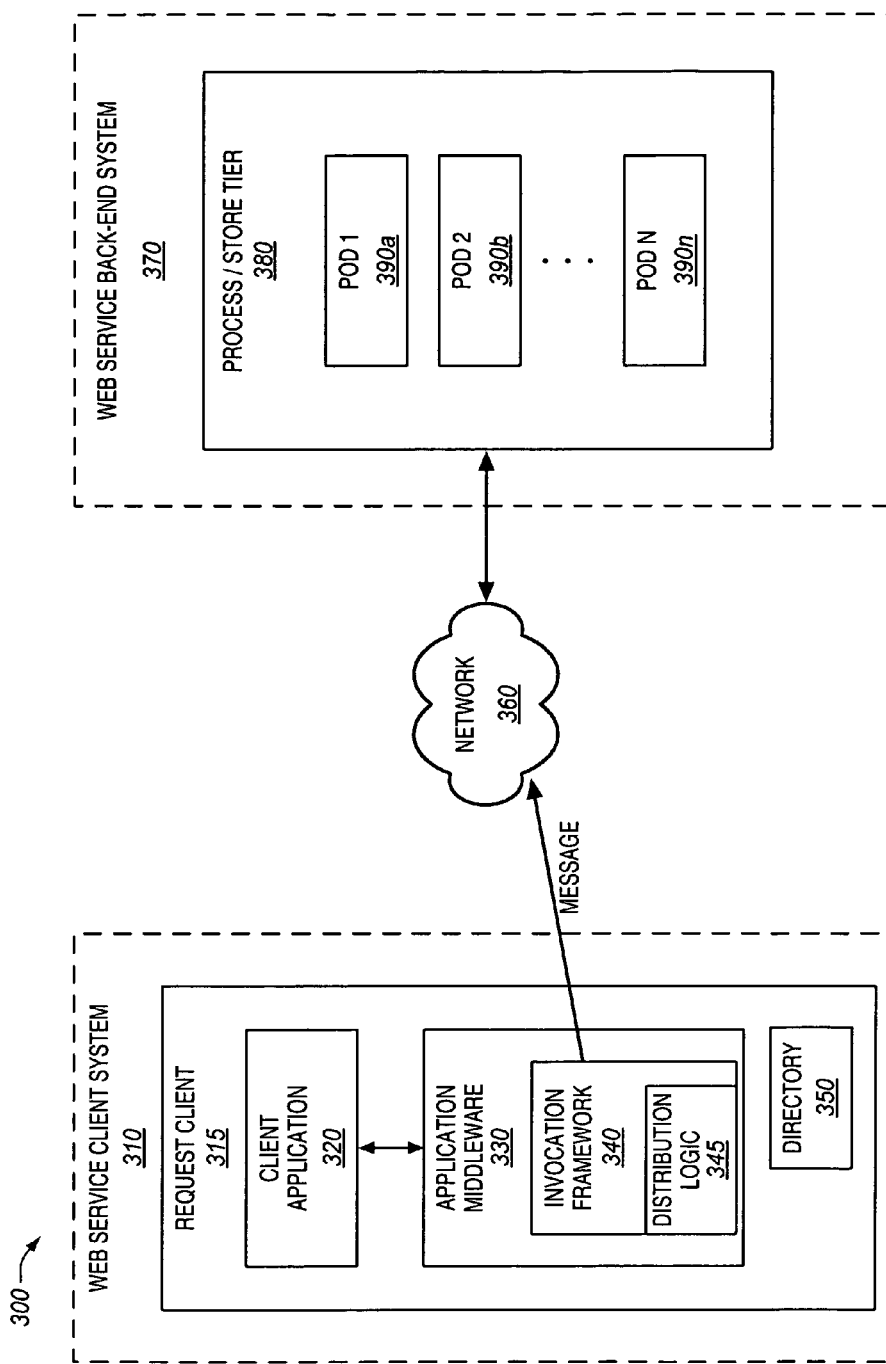
FIG. 3 is a block diagram illustrating one embodiment of a web service client system and a web service back-end system.

FIG. 3 illustrates a block diagram of a detailed view of one embodiment of a distributed web service system 300 that implements multiple "stateful" web services. A web service client system 310 is shown, which in some embodiments may be the same as the request client 250 described with respect to FIG. 2. In other embodiments, the web service client system 310 is located within the web service back-end system 220 of FIG. 2. Web service client system 310 may include a request client 315 to initiate a web service request.

In one embodiment, the request client 315 includes one or more client application 320 that performs web service requests. The client application 320 uses application middleware 330 to make web service requests. A key component of the application middleware 330 is the invocation framework 340. The invocation framework 340 is the component responsible for determining how the request from the client application 320 is realized as a web service request. The request client 315 may be any system that uses the invocation framework to send the request. In addition, the request client 315 may be a pod or other standalone systems, and the request client may or may not implement a web service.

The invocation framework 340 transforms the request from the client application 320 to a web service request by sending a message encapsulating the request to a web service that can handle the request. In some embodiments, the invocation framework 340 determines the network destination of the request, determines the format used to encode the message for network transmission, inserts appropriate headers and other meta-data, encodes the message, initiates connections to the destination (if needed), and transmits the request message.

The invocation framework 340 may further include distribution logic 345 embedded within the invocation framework 340 to determine where requests should be directed. In some embodiments, the distribution logic 345 may use a directory 350 in order to perform directory-based distribution. The directory 350 may be a component of the request client 310. In other embodiments, the directory 350 may be an external component and a common resource shared by more than one request client 315. In yet another embodiment, the distribution logic 345 may use more than one directory 350. In one embodiment, the directory 350 may be a Lightweight Directory Access Protocol (LDAP) directory.

A web service back-end system 370 is communicatively interfaced with the web service client system 310 via a network 360. In one embodiment, the web service back-end system 370 is the same as web service back-end system 220 described with respect to FIG. 2. Web service back-end system 370 may include a process/store tier 380. The process/store tier 380 may further include 'N' partition and/or subset pods 390a-390N. In other embodiments, there may additional other tiers included in the web service back-end system 370.

The web service back-end system 370 may be constructed using horizontal scaling techniques such that incoming web services requests are distributed among the multiple service pods 390a-390N. In some embodiments, pods 390a-390N hold subsets of the state of a "stateful" web service in order to enable large-scale geographically distributed deployments of the web service using the horizontally scaled techniques. Core components of embodiments of the invention include: (1) pods 390a-390N to hold a subset and/or partition of the web service's state; (2) one or more request clients including invocation framework 340 with embedded distribution logic 345 to perform directory-based distribution of the client's requests to pods 390a-390N; and (3) one or more directory 350 containing tables that associate lookup keys extracted from the requests to pods 390a-390N.

Embodiments of the invention combine directory-based load distribution and content-based request distribution by directing each client application request from client application 320 towards the pod 390a-390N that includes the subset of the state required to service the request. In some embodiments, the destination pod 390a-390N of the request may also be the request client 315 if the request client 315 is itself a pod and the invocation framework 340 decides the request should go to the same pod. More significantly, embodiments of the invention allow the invocation framework 340 to dynamically react to additions of new pods 390a-390N, additions of new states to a pod, and/or changes to the allocation of states to the various pods. Because these changes are reflected and/or provisioned into the directory 350, the invocation framework 340 automatically picks up these changes when it looks up the directory 350.

In one embodiment, configuration rules stored in the invocation framework 340 specify how to direct a request initiated by the client application 320 to a pod 390a-390N. In some embodiments, the request may be directed based on the header content, field content, and/or attributes of the request (generically referred to as attributes of the request) or based on additional content inserted by the invocation framework 340.

In some embodiments, when the invocation framework 340 is invoked by the client application 320 to initiate a request, it inspects the content of the request based on the configuration rules stored in the invocation framework 340. For example, a configuration rule may direct the invocation framework 340 or its distribution logic 345 to extract and transform particular attributes from the request. These attributes may then be used to determine if the distribution logic 345 should be invoked to create the lookup key and identify the lookup table(s) in the directory 350. Then, the configuration rules may direct the distribution logic 345 to search the identified tables in the directory 350 for matching lookup entries. The matching lookup entries are used to compute the destination pod(s) 390a-3950N that the request should be forwarded to.

In one embodiment, the distribution logic 345 embedded within the invocation framework 340 may create a lookup value based on those attributes to apply to the directory 350 for lookup. The lookup value may be used to search table(s) in the directory 350 for matching lookup entries. The resulting lookup entry returned from the directory 350 may then be used by the distribution logic 345 to compute the destination pod 390a-390N that the request should be directed to. The associations in the directory 350 may be direct or indirect (i.e., additional computation and/or transformation may be required to derive the destination pod 390a-390N based on the lookup entries returned).

In other embodiments, if a new state is assigned to pods 390a-390N, a directory instance 350 is updated. For example, the updating may include adding a new customer ID to the customer account management web service that is partitioned by customer ID. Similarly, the directory 350 may be updated when a state is reallocated (e.g., when a pod has is serving too many customers and the workload of the pod has to be divided among two new pods). For example, customers with odd numbered IDs may be assigned to a first new pod, and customers with even numbered IDs may be assigned to a second new pod. The directory 350 entries of the affected customers may then be updated accordingly. In one embodiment, if there are multiple directory instances 350, the updates may be replicated among the directory instances 350 in order to keep all of the directories 350 in-sync.

In some embodiments, a pod 390a-390N within a back-end system may itself be a request client 315. In such an embodiment, the pod 390a-390N may perform the above-described functions in order to send out a web service request of its own.

Figure 4:
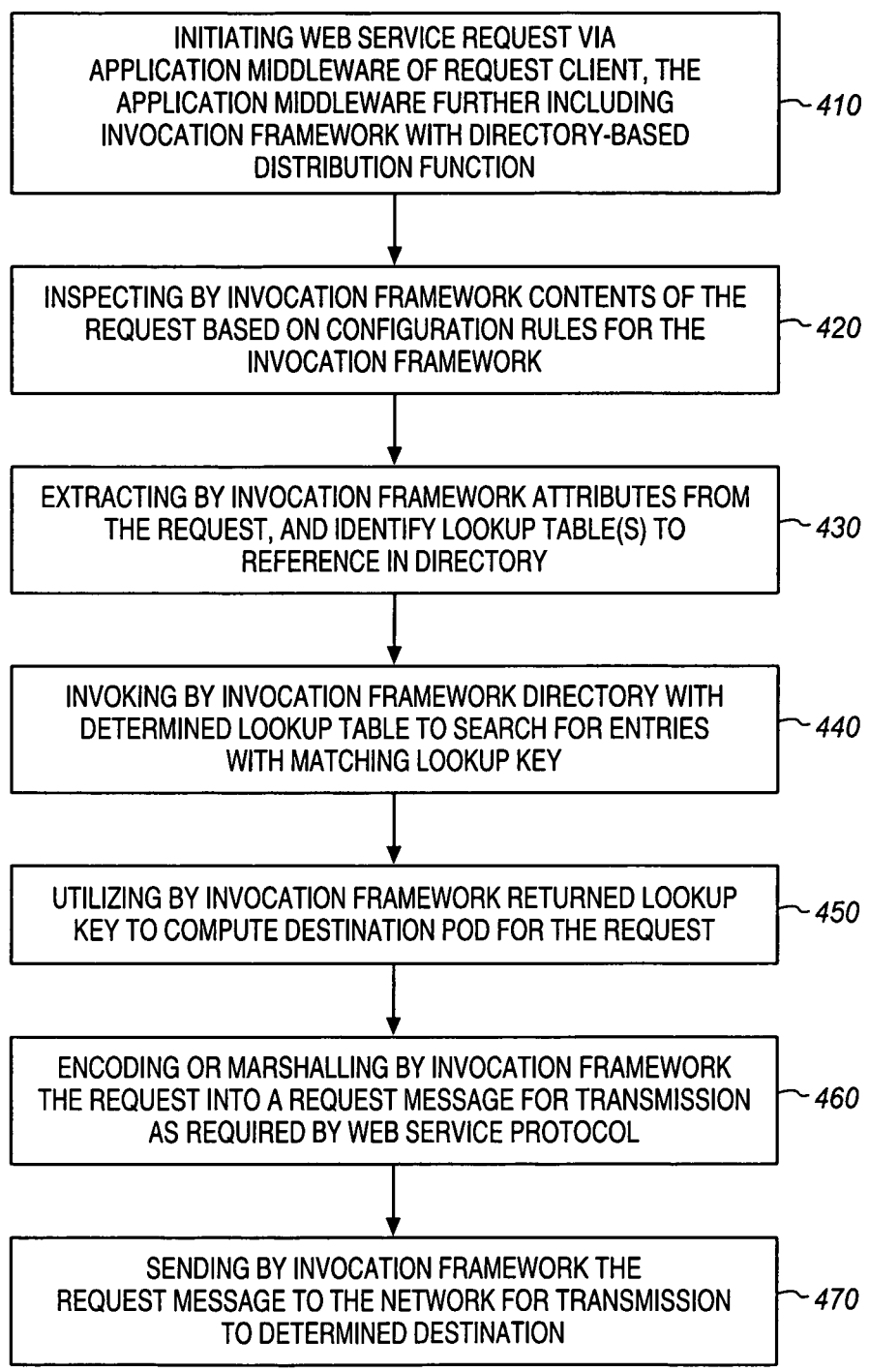
FIG. 4 is a flow diagram of a method according to one embodiment of the invention.

FIG. 4 is a flow diagram of a method of one embodiment of the present invention. Method 400 depicts a process of directory-enabled web service request distribution that utilizes a web service invocation framework in a request client to distribute the web service requests to destinations in a large and scalable distributed deployment environment. Method 400 may be implemented in any of the systems described with respect to FIGS. 1-3.

Method 400 begins at processing block 410, where a client application of a web service client system initiates a web service request by invoking an application middleware having an invocation framework. The invocation framework further includes a directory-based distribution function as part of distribution logic embedded in the invocation framework. Then, at processing block 420, the contents of the request are inspected by the invocation framework based on configuration rules for the invocation framework. At processing block 430, values are extracted from the request by the invocation framework based on the configuration rules in order to create a lookup value, and a lookup table(s) in the directory is identified. Then, at processing block 440, the invocation framework invokes the directory to search the identified lookup tables for entries that match the lookup key.

At processing block 450, the invocation framework uses the returned lookup entries to compute the destination address(es) that the request should be forwarded to. In one embodiment, the destination is a pod. In some embodiments, the invocation framework may perform a transformation on the returned lookup entry to determine a pod address. In other embodiments, the lookup entry itself may be a pod address, an Internet Protocol (IP) address, domain name, Uniform Resource Locator (URL), JAVA Message Service (JMS) queues, JMS topics, etc. One skilled in the art will appreciate that a variety of mappings and lookup return values may be used to direct the invocation framework to send the request to the correct destination.

At processing block 460, the invocation framework may encode or marshal the request into a request message for transmission as required by the web service protocol (e.g., inserting or changing the request certain headers). Finally, at processing block 470, the request message is sent to the network for transmission to the determined destination.

Figure 5:
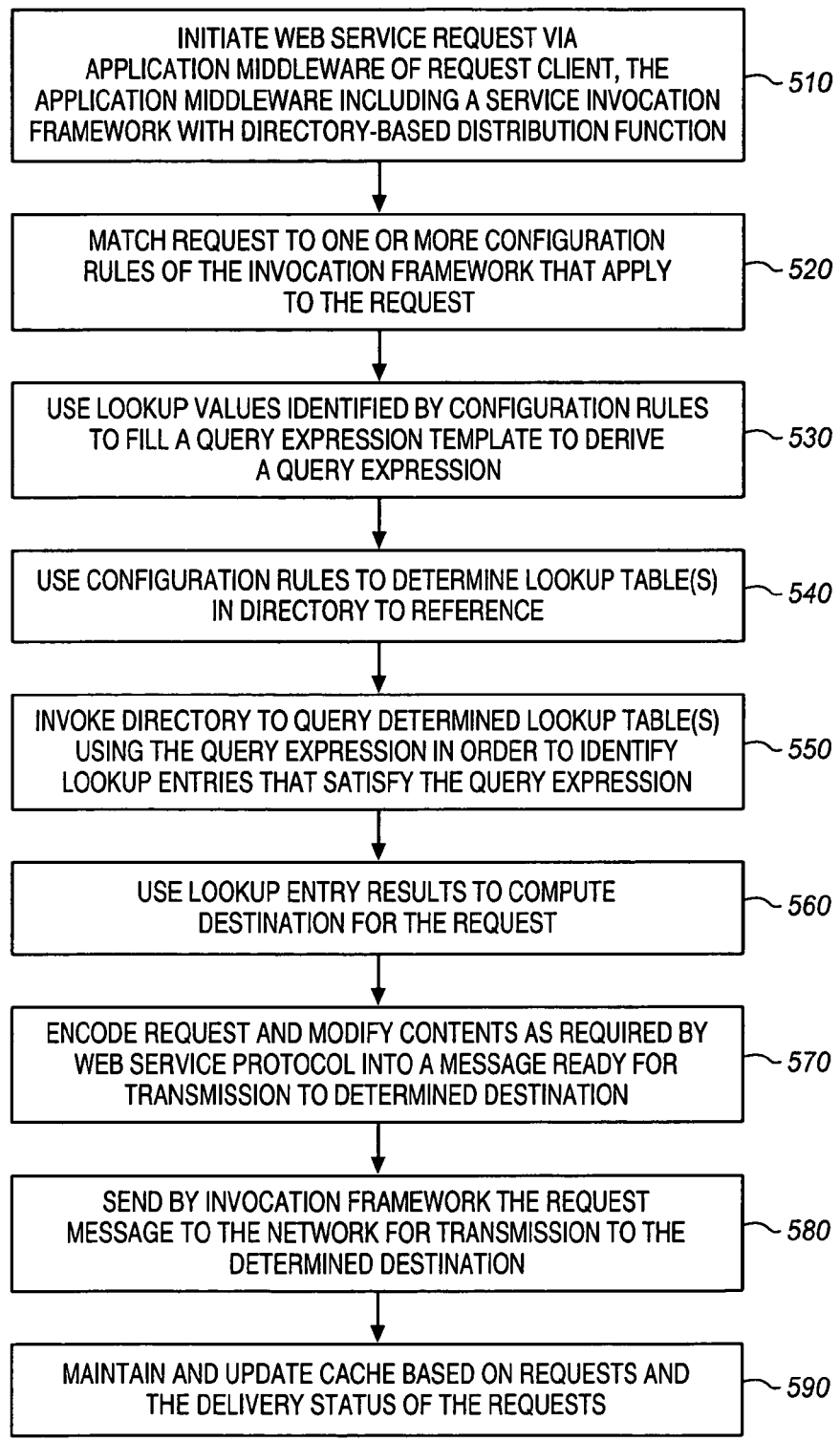
FIG. 5 is a flow diagram of a method according to another embodiment of the invention.

FIG. 5 is a flow diagram of a method of another embodiment of the present invention. Method 500 depicts a more detailed process for directory-enabled web service request distribution that utilizes a web service invocation framework in a request client to distribute the web service requests to destinations in a large and scalable distributed deployment environment. Method 500 may be implemented in any of the systems described with respect to FIGS. 1-3.

Method 500 begins at processing block 510, where a client application of a web service client system invokes the application middleware including a directory-based distribution-enabled invocation framework to initiate a request, and the invocation framework inspects the request content (e.g., its attributes and headers). The invocation framework further includes a directory-based distribution function as part of distribution logic embedded in the invocation framework. At processing block 520, the request is matched to one or more configuration rules of the invocation framework that apply to the request. The configuration rules specify how attributes of the request should be extracted and combined to create lookup values.

Then, at processing block 530, lookup values that were identified by the configuration rules are used to fill a query expression template in order to derive a query expression. Then, at processing block 540, the invocation framework uses the configuration rules to determine lookup table(s) in one or more directories that should be referenced for the request. In some embodiments, the query expression may be used instead of the configuration rules to determine the lookup table(s).

At processing block 550, the determined one or more directories are invoked to query the determined lookup table(s) using the query expression, in order to identify lookup entries that satisfy the query expression. Each lookup entry may provide a destination, such as a pod, to which the request should be forwarded. More than one destination may be returned in the case of replicated subsets. At processing block 560, the returned lookup entries are used by the invocation framework to compute the destination for the request. At processing block 570, the request is encoded and its contents (headers and attributes) may be modified as required by the web service protocol into a message that is ready for the transmission to the determined destination.

At processing block 580, the invocation framework sends the request message to the network for transmission to the destination specified by or computed from the one or more returned lookup entries. Finally, at processing block 590, a cache at the invocation framework is maintained and updated based on directory lookup results and the delivery status of the requests (i.e., success or failure).

In one embodiment, the invocation framework may maintain a cache of lookup result entries and a timeout associated with each entry. In other embodiments, the invocation framework may maintain a cache of lookup result entries and use a different mechanism to keep the cache in-sync. The operation of the mechanism may entail subscribing for changes from a directory capable of change notification. In further embodiments, the invocation framework may maintain a cache and invalidate cache entries based on observing responses to the requests.

The figures and methods described above depict large and scalable geographically distributed web services and a corresponding load distribution process to apply distributing requests to those web services. In particular, the load distribution process utilizes an invocation framework within the request client to distribute client initiated requests to the multiple servers/pods. By embedding a distribution function within an invocation framework of a request client, the process of a request client sending a web service request out to a standalone load distribution network device for distribution may be eliminated. As a result, the process of unpacketizing and repacketizing the request at the standalone load distribution network device in order to service and distribute the request may also be avoided.

In addition, by embedding the distribution function in the invocation framework of the application middleware, the client application is not aware of where or how the load distribution of requests is being accomplished, thereby providing a level of abstraction to implement the pod and load distribution of web service requests. The client application continues to operate normally by initiating a request by invoking the application middleware. The operation of the application middleware is a level of abstraction removed from the client application.

Figure 6:
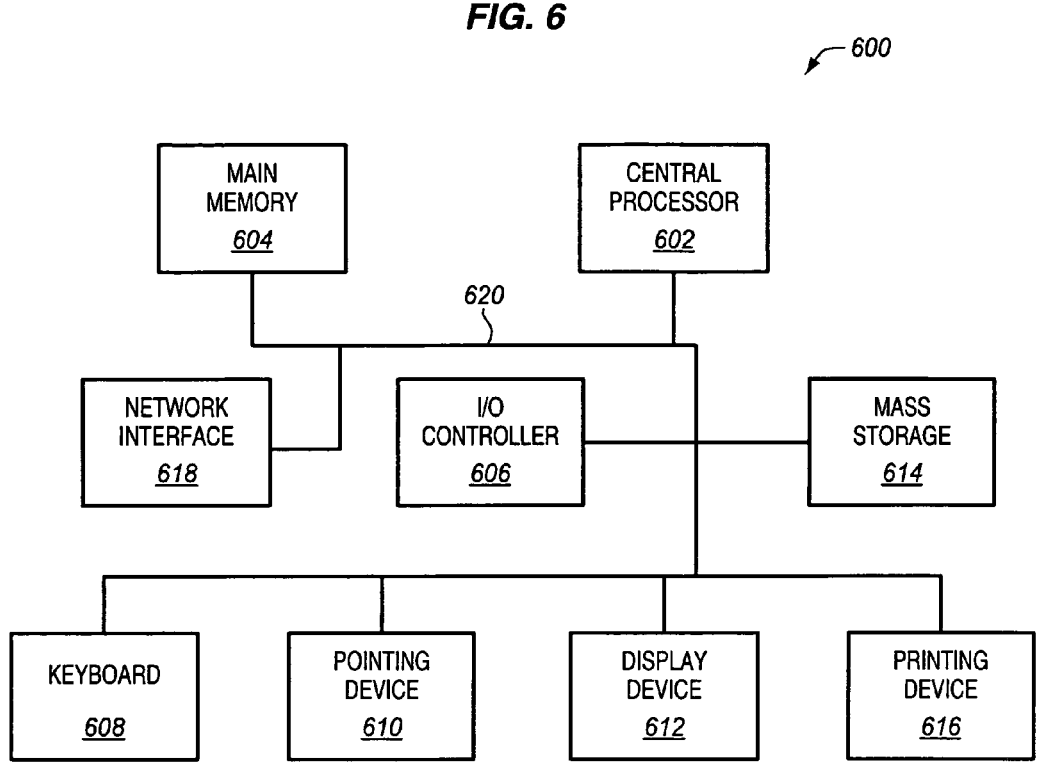
FIG. 6 is an illustration of an embodiment of a computer system.

FIG. 6 illustrates an exemplary computer system 600 in which certain embodiments of the present invention may be implemented. In one embodiment, system 600 may be implemented as part of request client 315 described with respect to FIG. 3. System 600 may also be implemented as part of pods 390a-390N described with respect to FIG. 3.

The system 600 comprises a central processor 602, a main memory 604, an input/output (I/O) controller 606, a keyboard 608, a pointing device 610 (e.g., mouse, track ball, pen device, or the like), a display device 612, a mass storage 614 (e.g., a nonvolatile storage such as a hard disk, an optical drive, and the like), and a network interface 618. Additional input/output devices, such as a printing device 616, may be included in the system 600 as desired. As illustrated, the various components of the system 600 communicate through a system bus 620 or similar architecture.

In a further embodiment, system 600 may be a distributed computing system. In other words, one or more of the various components of the system 600 may be located in a physically separate location than the other components of the system 600. Such components may be accessed and connected via a network to the other components.

In accordance with an embodiment of the present invention, the computer system 600 includes a Sun Microsystems computer utilizing a SPARC microprocessor available from several vendors (including Sun Microsystems, Inc., of Santa Clara, Calif.). Those with ordinary skill in the art understand, however, that any type of computer system may be utilized to embody the present invention, including those made by Hewlett Packard of Palo Alto, Calif., and IBM-compatible personal computers utilizing Intel microprocessor, which are available from several vendors (including IBM of Armonk, N.Y.).

Also, instead of a single processor, two or more processors (whether on a single chip or on separate chips) can be utilized to provide speedup in operations. It is further envisioned that the processor 602 may be a complex instruction set computer (CISC) microprocessor, a reduced instruction set computing (RISC) microprocessor, a very long instruction word (VLIW) microprocessor, a processor implementing a combination of instruction sets, and the like.

The network interface 618 provides communication capability with other computer systems on a same local network, on a different network connected via modems and the like to the present network, or to other computers across the Internet. In various embodiments of the present invention, the network interface 618 can be implemented utilizing technologies including, but not limited to, Ethernet, Fast Ethernet, Gigabit Ethernet (such as that covered by the Institute of Electrical and Electronics Engineers (IEEE) 801.1 standard), wide-area network (WAN), leased line (such as T1, T3, optical carrier 3 (OC3), and the like), analog modem, digital subscriber line (DSL and its varieties such as high bit-rate DSL (HDSL), integrated services digital network DSL (IDSL), and the like), cellular, wireless networks (such as those implemented by utilizing the wireless application protocol (WAP)), time division multiplexing (TDM), universal serial bus (USB and its varieties such as USB H), asynchronous transfer mode (ATM), satellite, cable modem, and/or FireWire.

Moreover, the computer system 600 may utilize operating systems such as Solaris, Windows (and its varieties such as CE, NT, 2000, XP, ME, and the like), HP-UX, IBM-AIX, PALM, UNIX, Berkeley software distribution (BSD) UNIX, Linux, Apple UNIX (AUX), Macintosh operating system (Mac OS) (including Mac OS X), and the like. Also, it is envisioned that in certain embodiments of the present invention, the computer system 600 is a general purpose computer capable of running any number of applications such as those available from companies including Oracle, Siebel, Unisys, Microsoft, and the like.

It should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

The foregoing description has been directed to specific embodiments. It will be apparent to those with ordinary skill in the art that modifications may be made to the described embodiments, with the attainment of all or some of the advantages. Therefore, it is the object of the appended claims to cover all such variations and modifications as come within the spirit and scope of the invention.

What is claimed is:

1. An apparatus, comprising:
a directory, storing a plurality of destination references to destination pods, and further storing a plurality of lookup keys corresponding to the destination references and having logic associated therewith; and
a request client to initiate a request for a web service, the request client including an application middleware having invocation framework with embedded distribution logic to distribute the request to a destination pod, the destination pod including a subset of a state associated with the web service, wherein the state of the web service is divided into subsets and the subsets are assigned to destination pods that implement the web service,
wherein the distribution logic is further configured to extract and transform a plurality of attributes extracted from the request, and wherein the transformed attributes are further used by the invocation framework to determine if the distribution logic should be used to create a lookup key to determine the destination pod,
wherein logic associated with the directory is further configured to dynamically assign a destination reference, corresponding to a destination pod to which a new state subset is assigned, to one or more existing lookup keys,
wherein the invocation framework further transforms the request received from the client application to a web service request for distribution to the destination pod, and wherein the distribution logic transforms the lookup entries returned from the directory to derive the destination address of the destination pod.

2. The apparatus of claim 1, wherein, the directory includes one or more lookup tables including lookup entries, the lookup entries having information identifying a plurality of destination pods.

3. The apparatus of claim 1, wherein the invocation framework further transforms the request by sending a message encapsulating the request to a web service that can handle the request.

4. The apparatus of claim 3, wherein the invocation framework determines the format used to encode the message for network transmission and encodes the message accordingly.

5. The apparatus of claim 4, wherein the request client is a pod.

6. The apparatus of claim 5, wherein the request client is the destination pod.

7. The apparatus of claim 1, wherein the distribution logic includes configuration rules to:
    instruct the distribution logic to extract the lookup key; and
    identify, based on the request and resulting lookup value, one or more of the lookup tables in the directory to reference in order to determine the destination pod for the request.

8. The apparatus of claim 1, wherein the distribution logic transforms the lookup entries returned from the directory to derive the destination address of the destination pod.

9. The apparatus of claim 1, wherein at least one subset is a partition having no overlap with other subsets.

10. A method, comprising:
    initiating at a request client a request for a web service;
    extracting and transforming, by an invocation framework of an application middleware of the request client, a plurality of attributes from the request based on configuration rules of the invocation framework, wherein the transformed attributes are further used by the invocation framework to determine if distribution logic should be used to create a lookup key to determine a destination pod;
    determining the destination pod, of a plurality of pods, to which the request is to be directed by applying a created lookup key, based on the transformed attributes, to a directory, wherein directory logic associates the lookup key to at least one entry including information to identify the destination pod; and
    transmitting, by the invocation framework, the request to the destination pod, wherein the invocation framework further transforms the request received from the client application to a web service request for distribution to the destination pod,
    wherein the distribution logic transforms the lookup entries returned from the directory to derive the destination address of the destination pod.

11. The method of claim 10, wherein the directory includes one or more lookup tables including the entries.

12. The method of claim 10, further comprising transforming by the invocation framework the entries returned from the directory to derive a destination address of the destination pod.

13. The method of claim 10, wherein the invocation framework further comprises distribution logic to perform the extracting one or more attributes and the determining the destination pod.

14. The method of claim 10, wherein the destination pod computes a subset of a state associated with the web service.

15. The method of claim 14, wherein the state of the web service corresponds to a subset of the web service that is persistent across multiple sessions of the web service.

16. A system, comprising: a web service interface; a web service system to provide a web service communicatively coupled to the web service interface; and
    a web service client system communicatively coupled to the web service interface, the web service client system including:
    a directory, storing a plurality of destination references to destination pods, and further storing a plurality of lookup keys corresponding to the destination references; and
    a request client to initiate a request for the web service, the request client including an application middleware having invocation framework with embedded distribution logic to distribute the request to a destination pod in the web service system, the destination pod including a subset of a state associated with the web service, wherein the state of the web service is divided into subsets and the subsets are assigned to destination pods that implement the web service,
    wherein the distribution logic is further configured to extract and transform a plurality of attributes extracted from the request, and wherein the transformed attributes are further used by the invocation framework to determine if the distribution logic should be used to create a lookup key to determine the destination pod,
    wherein logic associated with the directory is configured to dynamically assign a destination reference, corresponding to a destination pod to which a new state subset is assigned, to one or more existing lookup keys,
    wherein the invocation framework further transforms the request received from the client application to a web service request for distribution to the destination pod, and
    wherein the distribution logic transforms the lookup entries returned from the directory to derive the destination address of the destination pod.

17. The system of claim 16, wherein the directory includes one or more lookup tables including lookup entries, the lookup entries having information identifying a plurality of pods including the pod and the another pod.

18. The system of claim 16, wherein the invocation framework operates to construct messages for the web service, to determine where to send the messages, and to send the messages to a destination of the messages.

19. The system of claim 16, wherein the distribution logic includes configuration rules to:
    instruct the distribution logic to extract the lookup key; and
    identify, based on the request and resulting lookup value, one or more of the lookup tables in the directory to reference in order to determine the destination pod of the request.

* * * * *